US006654390B2

(12) United States Patent
Spiegelberg et al.

(10) Patent No.: US 6,654,390 B2
(45) Date of Patent: Nov. 25, 2003

(54) COUPLED-CAVITY TUNABLE GLASS LASER

(75) Inventors: Christine P. Spiegelberg, Tucson, AZ (US); Shibin Jiang, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 18 days.

(21) Appl. No.: 10/055,537

(22) Filed: Jan. 23, 2002

(65) Prior Publication Data

US 2003/0137999 A1 Jul. 24, 2003

(51) Int. Cl.$^7$ ................................................ H01S 3/30
(52) U.S. Cl. ......................................................... 372/6
(58) Field of Search ............................. 372/6; 385/122, 385/27, 57

(56) References Cited

U.S. PATENT DOCUMENTS

| | | | |
|---|---|---|---|
| 4,608,697 A | | 8/1986 | Coldren |
| 4,622,671 A | | 11/1986 | Tsang |
| 5,422,897 A | * | 6/1995 | Wyatt et al. ................ 372/6 |
| 5,425,039 A | | 6/1995 | Hsu et al. |
| 5,838,700 A | * | 11/1998 | Dianov et al. ............... 372/6 |
| 6,067,391 A | * | 5/2000 | Land .......................... 385/27 |
| 6,137,812 A | | 10/2000 | Hsu et al. |
| 6,418,255 B1 | * | 7/2002 | Maier ......................... 385/122 |
| 6,453,095 B2 | * | 9/2002 | Feng et al. .................. 385/37 |

OTHER PUBLICATIONS

G.P. Agrawal et al., Coupled–Cavity Semiconductor Lasers, Long–Wavelength Semiconductor Lasers, 1986, Chapter 8, pp. 333–371. no month.
Larry A. Coldren et al., Single Longitudinal Mode Operation of Two–Section GaInAsP/InP Lasers Under Pulsed Excitation, IEEE Journal of Quantum Electronics, Jun. 1983, vol. QE–19, No. 6 pp. 1057–1062.

Dietrich Marcuse et al., Rate Equation Model of a Coupled–Cavity Laser, IEEE Journal of Quantum Electronics, Feb. 1984, vol. QE–20, No. 2, pp. 166–176.
Larry A. Coldren et al., Analysis and Design of Coupled–Cavity Lasers—Part II: Transient Analysis, IEEE Journal of Quantum Electronics, Jun. 1984, vol. QE–20, No. 6, pp. 671–682.
Larry A. Coldren et al., Analysis and Design of Coupled–Cavity Lasers—Part I: Threshold Gain Analysis and Design Guidelines, IEEE Journal of Quantum Electronics, Jun. 1984, vol. QE–20, No. 6, pp. 659–670.
Charles H. Henry et al., Stabilization of Single Frequency Operation of Coupled–Cavity Lasers, IEEE Journal of Quantum Electronics, Jul. 1984, vol. QE–20, No. 7, pp. 733–744.
William Streifer et al., An Analysis of Cleaved Coupled–Cavity Lasers*, IEEE Journal of Quantum Electronics, Jul. 1984, vol. QE–20, No. 7, pp. 754–764.

(List continued on next page.)

*Primary Examiner*—Paul Ip
*Assistant Examiner*—Hung T Vy
(74) *Attorney, Agent, or Firm*—Eric A. Gifford

(57) ABSTRACT

A long-long coupled-cavity glass laser includes a pair of active waveguide cavities that are coherently coupled using a passive waveguide cavity. The active and passive waveguide cavities are of sufficient length so that multiple supermodes and multiple peaks in the coupling coefficient are created over the width of the gain spectra. The supermodes are gain flattened so that the one supermode that coincides with a peak in the coupling coefficient will oscillate. Tunability is achieved by changing the optical path length of either the passive or active waveguide cavities to match a different supermode to a different coupling coefficient peak.

38 Claims, 10 Drawing Sheets

OTHER PUBLICATIONS

William Streifer et al., Analysis of Cleaved Coupled–Cavity (C3) Diode Lasers—Part II: Frequency Modulation, Above Threshold Operation, and Residual Amplitude Modulation*, IEEE Journal of Quantum Electronics, Jun. 1985, vol. QE–21, No. 6, pp. 539–550.

Kevin Hsu et al., Single–mode tunable erbium:ytterbium fiber Fabry–Perot microlaser, Optics Letters, Jun. 15, 1994, vol. 19, No. 12, pp. 886–888.

Kevin Hsu et al., Continuous and discrete wavelength tuning in Er:Yb fiber Fabry–Perot lasers, Optics Letters, Feb. 15, 1995, vol. 20, No. 4, pp. 377–379.

W.H. Loh et al., High Performance Single Frequency Fiber Grating–Based Erbium:Ytterbium–Codoped Fiber Lasers, Journal of Lightwave Technology, Jan. 1998, vol. 16, pp. 114–118.

David L. Veasey et al., Arrays of distributed–Bragg–reflector waveguide lasers at 1536 nm in Yb/Er codoped phosphate glass, Applied Physics Letters, Feb. 8, 1999, vol. 74, No. 6, pp. 789–791.

W.T. Tsang et al., Stable single–longitudinal–mode operation inder high–speed direction modulation in cleaved coupled–cavity GaInP semiconductor lasers, Electronics Letters 19, 1983, pp. 488–490. no month.

* cited by examiner

| $d_{coupling}$ [mm] | $FSR_s$ [GHz] | $N_s$ | $F_{min}$ | $R_{min}$ | $FWHM_{coupling}$ [MHz] | $\Delta T_{max.}$ [K] | $\Delta T_{channel}$ [K] |
|---|---|---|---|---|---|---|---|
| 1 | 100 | 40 | 20 | 0.855 | 5000 | 77.5 | 2 |
| 2 | 50 | 80 | 40 | 0.924 | 1250 | 39 | 0.95 |
| 4 | 25 | 160 | 80 | 0.961 | 312 | 20 | 0.125 |
| 5 | 20 | 200 | 100 | 0.969 | 200 | 15 | 0.075 |
| 8 | 12.5 | 320 | 160 | 0.98 | 78 | 10 | 0.03 |
| 10 | 10 | 400 | 200 | 0.984 | 50 | 7.7 | 0.02 |
| 16 | 6.25 | 640 | 320 | 0.99 | 19 | 4.8 | 0.0075 |
| 20 | 5 | 800 | 400 | 0.992 | 12.5 | 4 | 0.005 |
| 25 | 4 | 1000 | 500 | 0.994 | 8 | 3 | 0.003 |
| 50 | 2 | 2000 | 1000 | 0.997 | 2 | 1.5 | 0.00075 |

Figure 10

COUPLED-CAVITY TUNABLE GLASS LASER

BACKGROUND OF THE INVENTION

1. Field of the Invention

This invention relates to tunable single-mode lasers and more specifically to a coupled-cavity tunable glass laser using a long-long coupled cavity scheme with a coupling waveguide.

2. Description of the Related Art

Rare-earth doped optical waveguides such as fibers or planar waveguides are used in amplifiers and lasers for telecommunications because they provide high optical gain over a broad spectral range. In the simplest laser geometry, a gain medium is placed in a cavity defined by two reflectors. The cavity has periodically spaced longitudinal modes with a wavelength spacing $\Delta\lambda$ given by:

$$\Delta\lambda = \frac{\lambda^2}{2nd} \qquad (1)$$

where n the refractive index of the gain medium and d the length of the cavity. The laser only oscillates at a frequency (or frequencies) that coincides with one (or several) of these cavity modes. Which one and how many modes reach threshold depends on the details of the gain medium. In the ideal case of a purely homogeneously broadened system only the mode that is closest to the gain maximum will oscillate and saturate the optical gain, i.e. pin the gain to the value that is necessary to reach the lasing threshold for this one mode. Even though rare earth doped glasses at elevated temperature are often considered to be dominantly homogenously broadened, inhomogeneous broadening is an important factor in these materials and for closely spaced longitudinal cavity modes, many lasing modes will oscillate.

To achieve single-mode operation, the active cavity length can be reduced so that the mode spacing exceeds the gain bandwidth. Since this approach limits the cavity length to a few hundred micrometers, the output power of such a laser is very small and typically tens of microwatts. [K. Hsu, C. M. Miller, J. T. Kringlebotn, E. M. In Taylor, J. Townsend, and D. N. Payne, "Single-mode tunable erbium:ytterbium fiber Fabry-Perot microlaser", Optics Letters, 19, 886 (1994), K. Hsu, C. M. Miller, J. T. Kringlebotn, and D. N. Payne, "Continuous and discrete wavelength tuning in Er:Yb fiber Fabry-Perot lasers" Optics Letters 20, 377 (1995)] With the development of waveguide/fiber Bragg gratings, at least one of the broad band reflectors can be replaced with a compact wavelength selective Bragg grating, which provides feedback over a spectral width that is much narrower than that of the gain medium. With a typical spectral bandwidth of these reflectors of about 0.1–0.2 nm, active cavities as long as a few centimeters with output power of several tens of milliwatts have been demonstrated [W. H. Loh, B. N. Samson, L. Dong, G. J. Cowle, and K. Hsu, "High Performance Single Frequency Fiber Grating-Based Erbium:Ytterbium-Codoped Fiber Lasers", Journal of Lightwave Technology, Vol. 16, No. 1, p. 114 (1998), D. L. Veasey, D. S. Funk, N. A. Sanford, and J. S. Hayden, "Arrays of distributed-Bragg-reflector waveguide lasers at 1536 nm in Yb/Er codoped phosphate glass", Applied Physics Letters, Vol. 74, No. 6, p. 789 (1999)]. Longer cavities could provide even higher power output but also lead to a large number of longitudinal cavity modes inside the selected wavelength band and therefore to multimode operation of the laser.

Limited wavelength tunability can be achieved by controlling the temperature or length of the fiber Bragg grating to shift the spectral position of the reflection peak. Owing to the very small temperature dependence of the glass, the thermal tuning range of these lasers is on the order of a few nanometers only. Strain or compression tuning of specially designed fiber Bragg grating can result in larger tuning ranges. However, this kind of tuning is typically done using piezoelectric transducers and the effects of creep and hysteresis limit the wavelength reproducibility and so far have prevented the practical implementation of these lasers. Distributed feedback lasers also demonstrated single frequency operation with a high degree of side mode suppression. Due to the fixed grating, wavelength tunability of these lasers is, however, problematic as well.

Coupled cavity lasers, in which an external cavity (active or passive) is coupled to an active laser cavity, have the potential of combining mode selectivity with the possibility of wavelength tuning. The external cavity acts as a periodic wavelength dependent mirror providing minimum cavity loss only for certain longitudinal modes of the active laser cavity. The performance of such lasers depends on the relative optical length of the cavities where the distinction can be made between long-long and long-short cavity assemblies. In the case of a long-short coupled cavity, one cavity is short enough so that its mode spacing is large compared to the spectral width of the gain profile. All but the mode that is inside the gain profile of the active medium are suppressed. To tune the wavelength of such a laser over a region comparable to the width of the gain spectrum, the optical length of the short cavity has to be changed considerably. An example of such a short external cavity fiber laser is given in U.S. Pat. Nos. 6,137,812 and 5,425,039. By placing a fiber assembly into fiber ferrule alignment fixtures, the length of a short air gap can be changed by piezoelectric means. Long-long cavities, on the other hand, have the advantage that only small changes in the optical path of either cavity are needed to obtain a broad tuning range. This effect is called the Vernier effect. In addition to that, long-long cavities are able to provide larger output powers. The major drawback of known long-long devices has been mode stability.

The primary application of long-long coupled-cavity structures is found in fixed wavelength semiconductor lasers to achieve large side-mode suppression (see U.S. Pat. Nos. 4,608,697 and 4,622,671). As shown in FIG. 1 of the '697 patent, active sections 1 and 2 of slightly different length are separated by an air gap 3 created by etching or cleaving a monolithic heterostructure. Mirror facets are formed on the ends of each active section. Coupling of the two cavities is achieved through free space. If the gap between the two cavities is large, high diffraction losses are introduced and coupling between the two cavities is weak. Therefore, in this geometry the length d of the gap is typically chosen to be less than ten times the wavelength 10 $\lambda$. Coupling between the two cavities depends also dramatically on the distance between them and is maximum when:

$$d = M\frac{\lambda}{2} \qquad (2)$$

where d is the gap distance and M is an integer. In this case the optical fields of the two cavities interact constructively and the situation corresponds to a transmission maximum of the coupling Fabry-Perot cavity 3.

The combined cavity modes are often called supermodes and the mode spacing Λ of the combined long-long coupled cavity supermodes is given by:

$$\Lambda = \frac{\lambda_0^2}{2\Delta nd} \quad (3)$$

where (Δnd) is the difference in the optical path length between the two cavities and $\lambda_0$ the wavelength.

Due to limitations in achieving a homogeneous pump (current) profile, telecommunication semiconductor lasers usually have active cavities of only a few hundred micrometers in length. Typically the difference in cavity length is less than 50 micrometers and the mode spacing of the supermodes is on the order of 10 nm when working, for instance, inside the telecommunications C-band, around 1550 nm. This creates a situation in which only a few supermodes exist inside the gain spectrum and all but one of the supermodes are suppressed by gain roll-off. A short air gap of about 1.5 μm has a free spectral range (FSR) of more than 250 nm, which also corresponds to the separation of peaks in the coupling coefficient. Only one broad transmission or coupling peak exists inside the spectral width of the gain profile. The coupling cavity is effective to create the supermode structure but has no role in selecting a particular supermode.

Limited tunability of semiconductor coupled-cavity lasers is achieved by tuning one or both of the active cavities via pump current to move the supermode back-and-forth. Useful tuning ranges of about 10 nm have been demonstrated (W. T. Tsang, N. A. Olsson, R. A. Linke, and R. A. Logan, "Stable single-longitudinal-mode operation under high-speed direction modulation in cleaved coupled-cavity GaInP semiconductor lasers", Electronics Letters 19p. 415 (1983)). Tunable semiconductor lasers are also very low power, less than 5 mW, due to the short length of the active cavities.

Despite intensive modelling of coupled-cavity lasers, practical implementation of single mode operation of such lasers has proven to be difficult. (see for instance Henry et al. (1984) [C. H. Henry and R. F. Kazarinov, IEEE J. Quantum Electron. QE-20, 733 (1984)], Coldren et al. (1983) [L. A. Coldren, K. J Ebeling, B. I. Miller, and J. A. Rentschler, "Single Longitudinal Mode Operation of Two-Section GaInAsP/InP Lasers Under Pulsed Excitation" IEEE J. Quantum Electron. QE-19, 1057 (1983)], Marcuse et al. (1984) [D. Marcuse and T. P. Lee, "Rate Equation Model of a Coupled-Cavity Laser" IEEE J. Quantum Electron. QE-20, 166 (1984)], Streifer et al. (1984) [W. Streifer, D. Yevick, T. L. Paoli, and R. D. Burnham, "An Analysis of Cleaved Coupled-Cavity Lasers", IEEE J. Quantum Electron. QE-20, 754 (1984)and "Analysis of Cleaved Coupled-Cavity ($C^3$) Diode Lasers—Part II: Frequency Modulation, Above Threshold Operation, and Residual Amplitude Modulation", IEEE J. Quantum Electron. QE-21, 539 (1985)], Coldren et al. (1984) [L. A. Coldren, T. L. Koch, "Analysis and Design of Coupled-Cavity Lasers—Part I: Threshold Gain Analysis and Design Guidelines" IEEE J. Quantum Electron. QE-20, 659] (1984) and "Analysis and Design of Coupled-Cavity") This is enforced in U.S. Pat. No. 4,896,325 that states "Some time ago, it was felt in the art that any wavelength over the gain bandwidth of a laser could be selected by a properly designed two-section, coupled-cavity structure using the combined mode-jump/continuous tuning philosophy. We know now that it is not possible to get sufficient spurious-mode suppression and unambiguously select a particular wavelength over the entire band." The main difficulty in achieving the stability necessary for these lasers stems from the refractive index variations associated with the injection of current and temperature changes causing frequency instability. It is well known that in semiconductor lasers only small changes in the temperature or the pump power induce large refractive index changes.

SUMMARY OF THE INVENTION

In view of the above problems, the present invention provides a high power tunable single-mode laser.

This is accomplished with long-long coupled-cavity glass laser in which the two active waveguide cavities are coherently coupled using a passive waveguide cavity. Pump light is coupled into the active cavities to invert the gain medium and provide the necessary amplification to sustain lasing. Typically, one of the active cavities will be optically pumped slightly above its lasing threshold while the other one is excited to transparency close to its single cavity threshold. In another mode of operation, both active cavities are pumped above their individual threshold. In the case of strong coherent coupling between the two active cavities, new lasing eigenmodes of the coupled system are created. The active and passive waveguide cavities are of sufficient length so that multiple supermodes and multiple peaks in the coupling coefficient are created over the width of the gain spectra. The supermodes are gain flattened so that the one supermode that coincides with a peak in the coupling coefficient will oscillate. In other words, a first Vernier effect creates the supermode structure and a second Vernier effect selects a particular supermode.

Tunability is achieved by changing the optical path length of either the passive or active waveguide cavities. A broad tuning range is achievable because only small variations in path length are required to match a different supermode to a different peak in the coupling coefficient. Stable single-mode operation is made possible by the relative insensitivity of glass to fluctuations in temperature and pump power as compared to semiconductor lasers. High power levels are attained because the active waveguide cavities can be relatively long without mode hops and are preferably formed of a high gain Er:Yb co-doped phosphate glass.

These and other features and advantages of the invention will be apparent to those skilled in the art from the following detailed description of preferred embodiments, taken together with the accompanying drawings in which:

Figure 8:
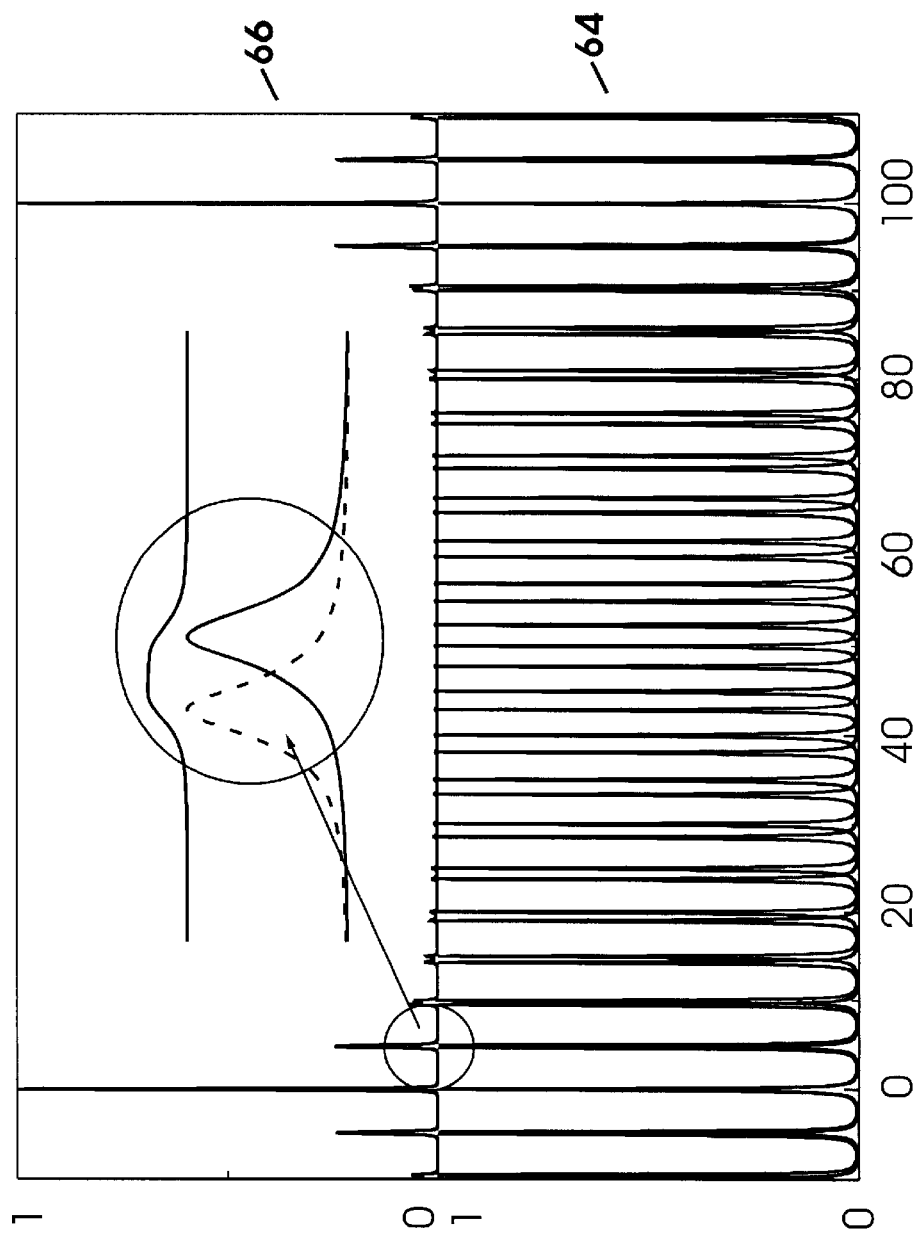
Figure 9:
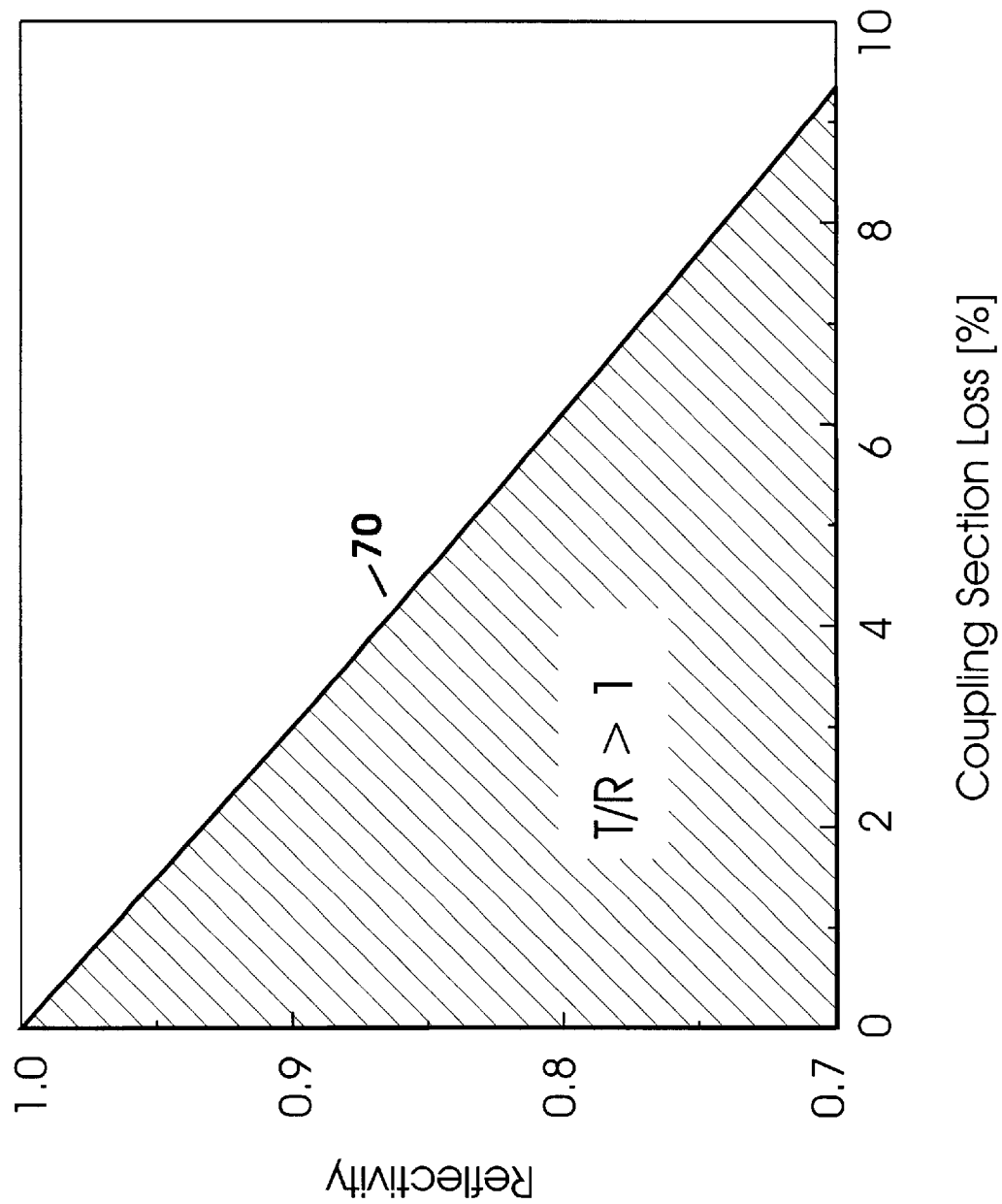

FIG. 8 shows the stability criterion used to determine the maximum length of the active cavities; and FIG. 9 shows the minimum reflectivity required for the coupling section to establish strong coupling between the active cavities as a function of the coupling section loss.

DETAILED DESCRIPTION OF THE INVENTION

A long-long coupled-cavity glass laser includes a pair of active waveguide cavities that are coherently coupled using a passive waveguide cavity. The active and passive waveguide cavities are of sufficient length so that multiple supermodes and multiple peaks in the coupling coefficient are created over the width of the gain spectra. The supermodes are gain flattened so that the one supermode that coincides with a peak in the coupling coefficient will oscillate. Tunability is achieved by changing the optical path length of either the passive or active waveguide cavities to match a different supermode to a different coupling coefficient peak. Stable single-mode operation is made possible by the relative insensitivity of glass to fluctuations in temperature and pump power as compared to semiconductor lasers. High power levels are attained because the active waveguide cavities can be relatively long without mode hops and are preferably formed of a high gain Er:Yb co-doped phosphate glass.

Mode Selection and Tuning

Figure 1:
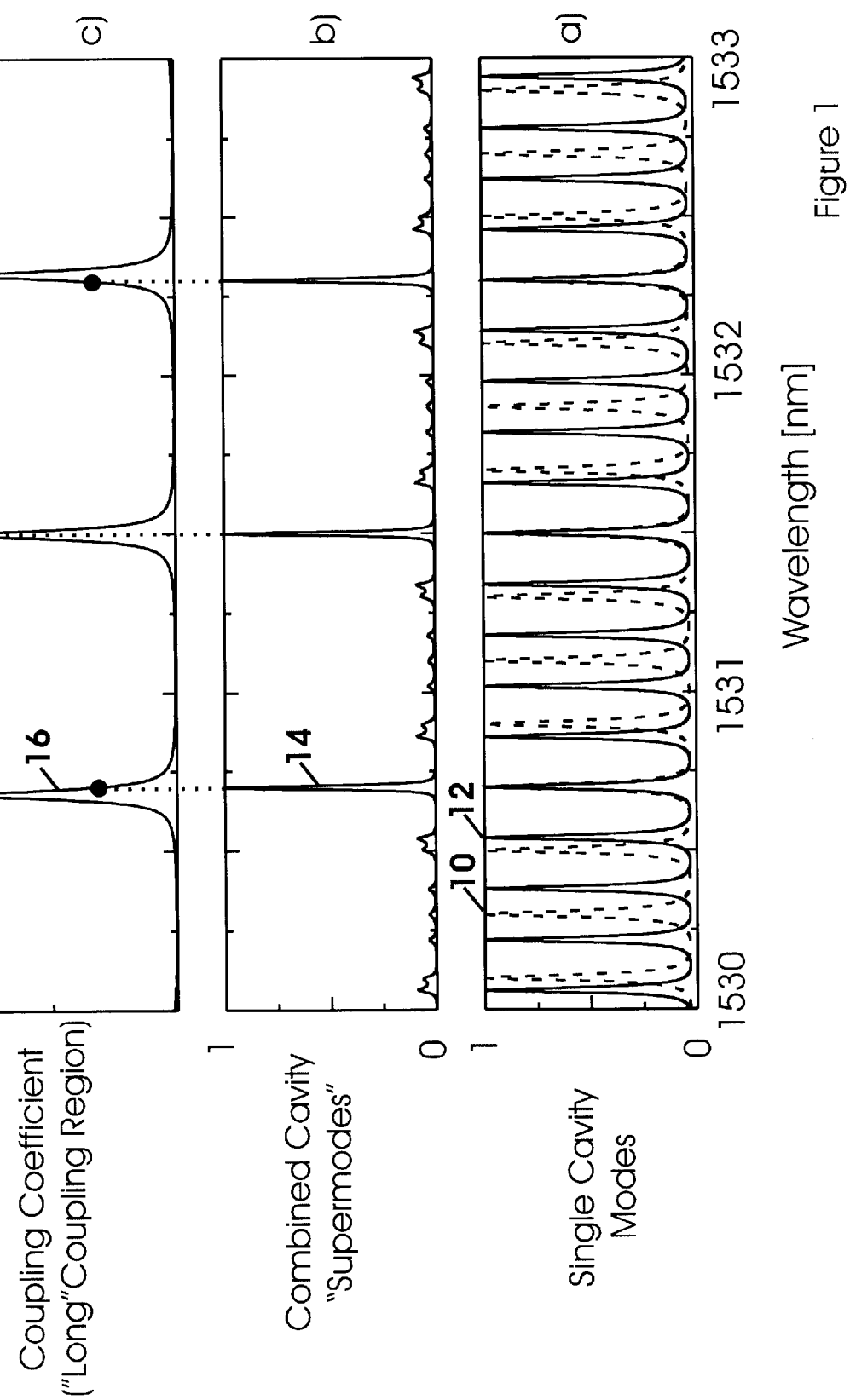
FIGS. 1a through 1c illustrate the supermode structure and coupling coefficient for long-long glass laser in accordance with the present invention.

FIGS. 1a–1c display the mode selection and tuning mechanism that is used in the present invention. As a practical example, spectra are shown for the telecommunication relevant spectral range near 1530 nm. The bottom diagram in FIG. 1a shows single cavity modes 10 and 12 (maxima of transmission) for each of the two active cavities. Due to a difference in length, the two cavities (dashed 10 and full line 12) have different mode spacings and only every fifth of the longer and every fourth of the shorter cavity modes coincide with a cavity mode of the other cavity. In the case of strongly coupled cavities this leads to new eigenmodes of the coupled system, the supermodes 14 which are displayed in FIG. 1b as the product of the two transmission coefficients. In this example the supermodes are 0.8 nm or 100 GHz apart from each other (the ITU DWDM channel spacing), the active cavities are about 4 and 5 mm long. A refractive index of 1.5 has been assumed. FIG. 1c shows the spectrum of the coupling coefficient 16 T/R for a roughly 1 mm long coupling section. For simplicity, symmetric coupling cavity reflectivities of R=0.8 are chosen, which include 5% scattering loss in the coupling section. With these parameters, the maxima of the coupling coefficient are clearly larger than 1, providing strong coupling for the two active cavities. From the figure it is clear how the coupling section adds another wavelength selective element to the Vernier—created periodic supermode structure. If the optical length of the coupling section is chosen appropriately, only the one supermode at 1531.5 nm will be able to oscillate, while the other supermodes are detuned with respect to the coupling section modes.

Figure 2:
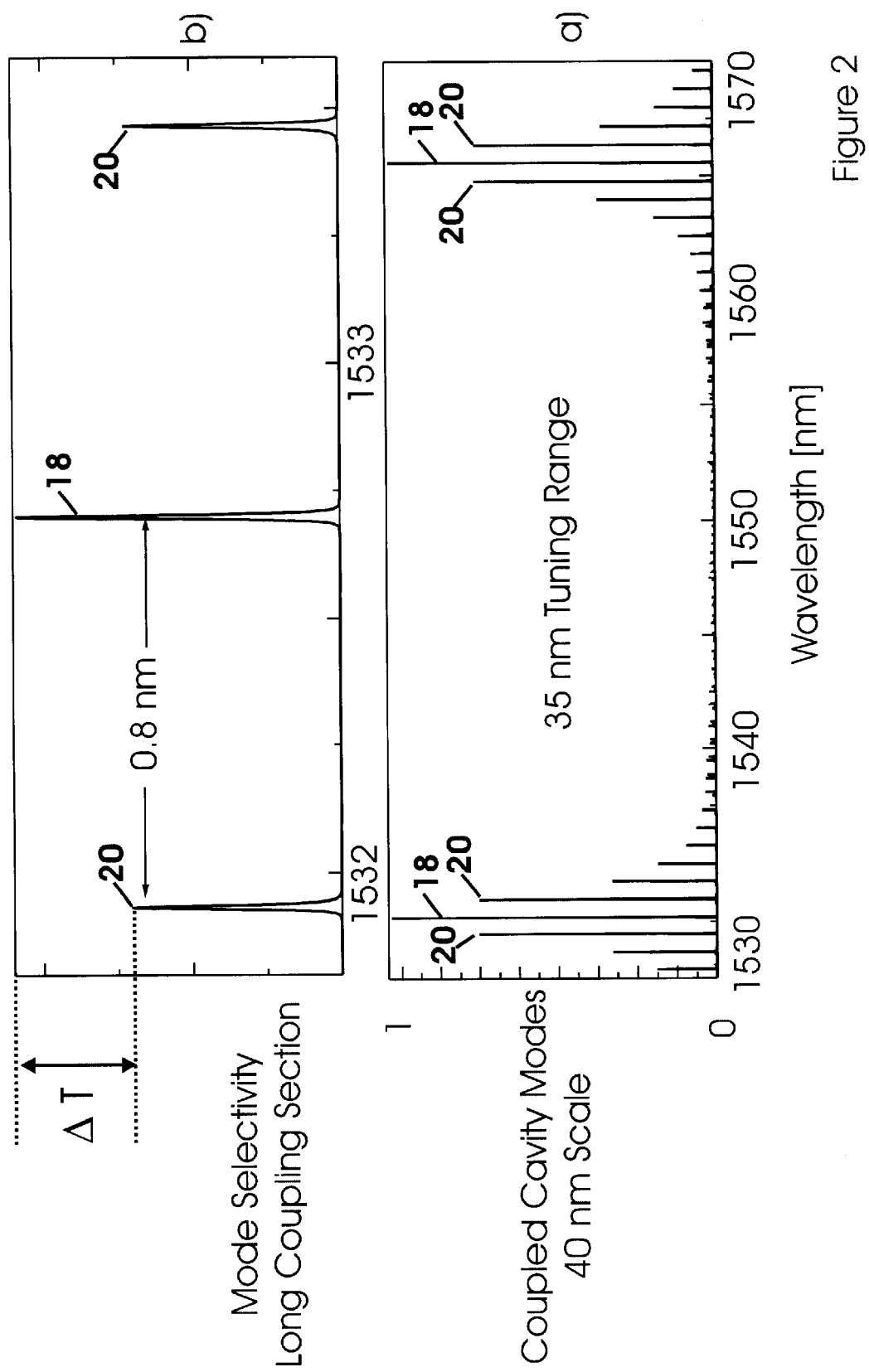
FIGS. 2a and 2b illustrate tuning range and side mode suppression in the case of a long coupling section.

FIG. 2a shows the coupled 3-cavity-modes 18—the product of the transmission coefficients of all three cavities on a wider wavelength scale. Repeat modes occur about 35 nm apart from each other. By slightly changing the optical length of the coupling section, every supermode in this 35nm wavelength range can be selected. Thus, 35 nm corresponds to the maximum tuning range for this example. FIG. 2b shows the 3-cavity-modes on a 1.8 nm scale and shows the good suppression of side modes 20 that is determined by $\Delta T$.

Figure 3:
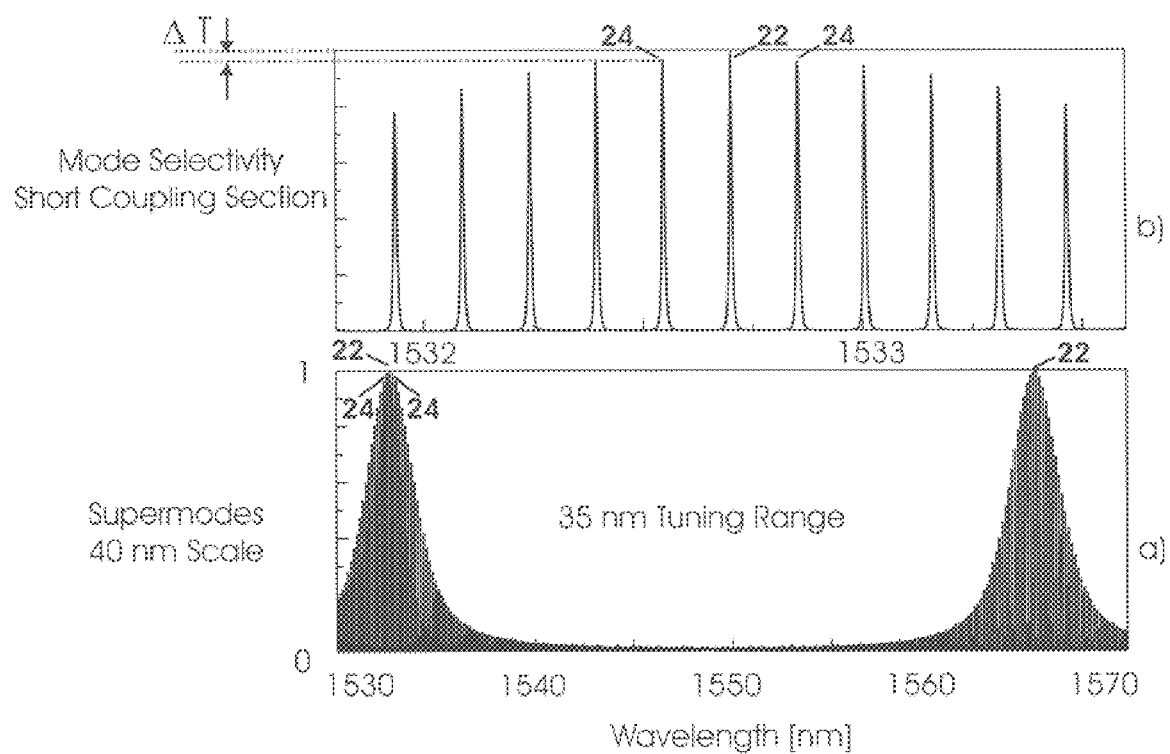
FIGS. 3a and 3b show tuning range and side mode suppression for a coupled cavity laser with a short coupling section.

For comparison the case where the coupling section is not long enough (1.5 $\mu$m long) to act as a wavelength selective element is plotted in FIG. 3a. Again, if the two active cavities are of appropriate length and strong coupling is established, the Vernier-effect leads to supermodes 22 in the coupled system. The coupling cavity has no selection effect; hence there is no equivalent to the 3-cavity modes. If the length difference between the two active cavities ($\approx$5 mm long cavities with symmetric 90% reflectors) is very small, (24 $\mu$m in this example), the distance between supermodes, where the active cavity modes completely coincide, can be as wide as 35 nm as well. However, the figure illustrates, that the suppression of side modes 24 is much worse in this case. Neighboring single cavity modes will still slightly overlap and lead to a much smaller side mode suppression $\Delta T$. This is shown in FIG. 3b, where the same spectrum is shown again on a 1.8 nm scale with a much higher likelihood of mode hopping.

Coupled-Cavity Tunable Laser

Figure 4:
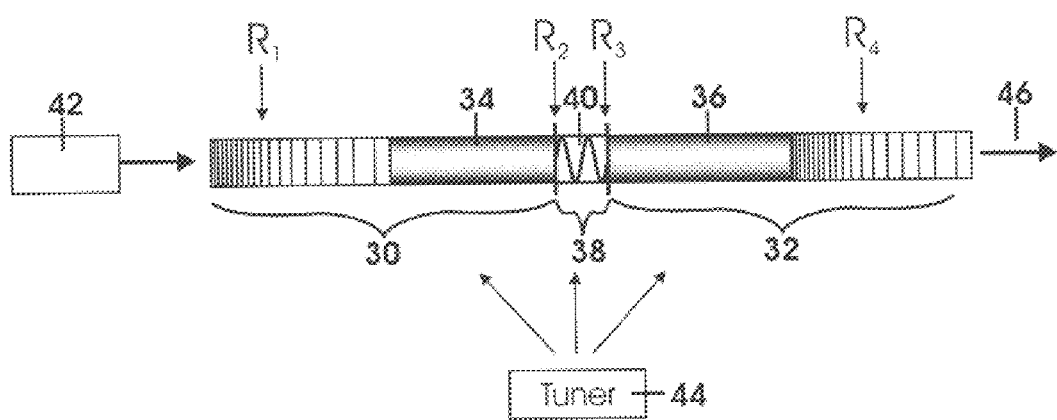
FIG. 4 is a schematic illustration of a coupled-cavity tunable fiber/planar waveguide laser in accordance with the present invention.

FIG. 4 is a schematic illustration of a long-long coupled-cavity tunable laser 28. Two active cavities 30 and 32 are established by placing two rare earth doped glass fibers/planar waveguides 34 and 36 between cavity mirrors $R_1/R_2$ and $R_3/R_4$. At least one of $R_1$ and $R_4$ comprise a gain flattening filter (or reflector) that flattens the gain spectra of the doped glass. The inner coupling section 38 is a passive (no gain medium) waveguide 40 formed between mirrors $R_2$ and $R_3$. Pump 42 couples pump light into the active cavities to invert the gain medium and provide the necessary amplification to sustain lasing. Pump 42 can be a single-mode pump that directs pump light into the core or a multi-mode pump that couples the pump light into the inner cladding around the core. Pump light is preferably coupled to the open end of the laser as shown but in the case of multi-mode pumping may be coupled from the side. The pump beam can be launched from one or both sides of the coupled cavity structure, whereas the latter is preferred as it leads to more symmetric excitation conditions. A tuning mechanism 44 changes the optical path length of at least one of the active or passive cavities to tune the wavelength of the laser output 46.

Active cavities 30 and 32 define the longitudinal mode structures 10 and 12 shown in FIG. 1a. The passive coupling section 38 has a coupling coefficient C that defines the supermode structure with multiple supermodes 14 in a full tuning range (FTR) as shown in FIG. 1b. The passive coupling section is of sufficient length to define multiple coupling coefficient peaks 16 in the wavelength range. The two gain flattening Bragg-reflectors flatten the gain spectra so that the laser outputs the one supermode that coincides with a coupling coefficient peak, i.e. the 3-cavity mode 18 shown in FIG. 1a. Gain flattening can also be achieved by using only one gain flattening transmission filter and broadband end reflectors. The tuning mechanism 44 is capable of changing the optical path length of at least one of said active waveguides and said passive waveguide to match a different supermode 14 to a different coupling coefficient peak 16 to tune the wavelength of the laser output 46 over the FTR.

Tuning can be achieved by controlling the optical pathlength, i.e. the refractive index of the active and passive cavities. In the preferred embodiment, the temperature of at least one of the active fiber/waveguide cavities is controlled by a thermoelectric device, e.g. a TEC cooler, which acts as a phase shifter to establish the desired supermode structure. Keeping the temperature and the pumping conditions in the active cavities stable, broadband tuning over discrete supermode wavelength channels is achieved by changing the optical path length of the inner coupling cavity only. The refractive index of the inner cavity can be controlled via the temperature of the fiber/waveguide by implementing another thermoelectric control device. To achieve fast wavelength switching, it is, however, desirable to employ an electro-optic or all-optical fiber/waveguide phase modulator inside the coupling section. Continuous tuning over wavelength regions that are not accessible by the supermode channels is possible by simultaneously changing the refractive index (via temperature, pump power, or external fields) of the two active cavities.

Mode stability is much more favorable in the glass laser of the present invention. Not only is the temperature induced linear expansion coefficient of glass typically two orders of magnitude smaller than in semiconductor material (GaAs at 300K: $5 \cdot 10^{-5}$ $K^{-1}$, silica glass at 300 K: $5 \cdot 10^{-7}$) but the nonlinear effects that lead to refractive index changes with pump power fluctuation are of much less importance in rare earth doped glasses. Temperature induced refractive index changes are much smaller in glasses than in semiconductor materials, as well. Therefore, when working with glass fiber/waveguide devices, much longer cavities providing large power output can be used. By implementing a long waveguide coupling section and making use of the Vernier effect a large FTR can be facilitated at the same time. This very compact 3-cavity design requires no moving parts.

The active and passive cavities can be implemented with fiber or planar waveguide technology. The design can be all-fiber, all-planar waveguide or a combination thereof. More specifically, high-gain optical fiber or likewise rare earth—doped glass waveguides can be used inside the active cavities and either low loss optical single-mode fiber or planar waveguides can be used inside the coupling region. For fast wavelength tuning the passive fiber or waveguide should contain an electro-active material like Lithium-Niobate, semiconductor material, conjugated polymers or liquid crystals.

Figure 5:
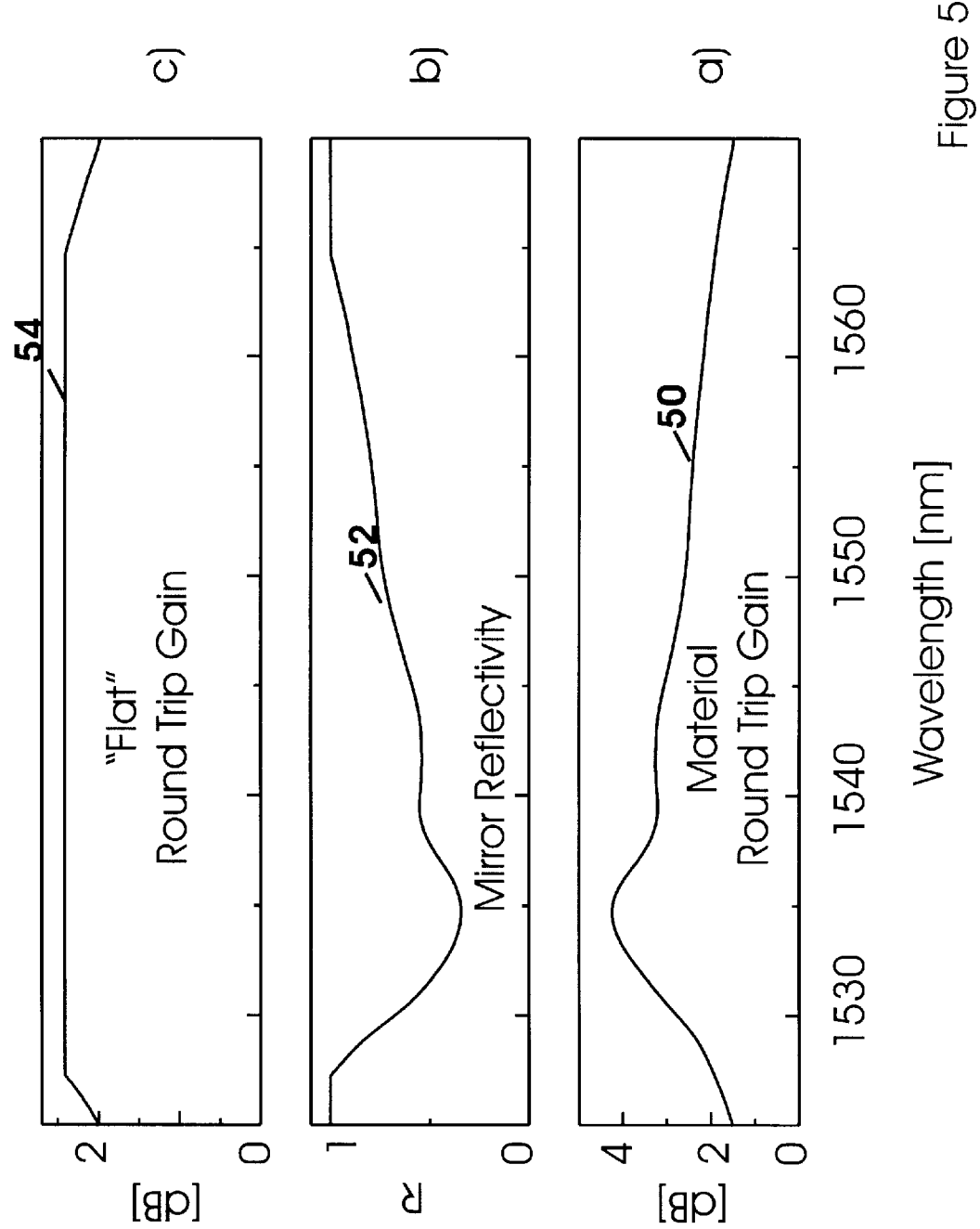
FIGS. 5a through 5c illustrate the gain spectrum of Erbium doped glasses, the reflectivity spectrum of the gain flattening Bragg grating, as well as the gain-flattened spectrum in accordance with the present invention.
Figure 6:
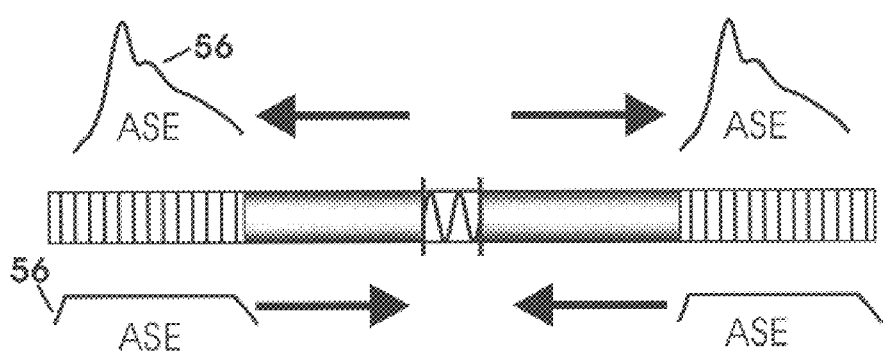
FIG. 6 illustrates the implementation of gain flattening Bragg reflectors (or dielectric coatings) into the laser cavity.

The gain flattening mechanism is illustrated in FIGS. 5 and 6. FIG. 5a shows a typical gain spectrum 50 for Er doped glasses; with maximum gain around 1535 nm. With no wavelength selectivity given by the cavity structure, any laser will preferably lase at the maximum of its gain spectrum. Since this effect counteracts the wavelength selectivity of the coupled cavity laser it is preferable to introduce gain-flattening elements. FIG. 5b shows the reflectivity spectrum 52 of a gain flattening Bragg reflector designed to flatten the gain profile shown in FIG. 5a. FIG. 5c displays the flat round trip gain 54 that is achieved by using two symmetric gain flattening reflectors as cavity end mirrors. As shown in FIG. 6 the amplified stimulated emission (ASE) spectrum 56 closely resembles the optical small signal gain of the gain medium. Each mirror will reflect the ASE that builds up during every single pass through the cavity in a way so that the reflected ASE spectrum 58 is spectrally flat over the FTR. In this case, only the mode selectivity of the cavity design will determine the lasing wavelength or frequency.

Design Criteria for Coupled-Cavity Laser

It is clear that the fiber/waveguide laser described in this invention strongly depends on the length of the three cavities as well as on a proper design of the cavity reflectors. A detailed theoretical understanding of the coherently coupled cavity laser is extremely difficult, however, several design criteria can be obtained from very basic considerations.

To create the coherent superposition of the two active cavities that results in periodic supermodes shown in FIG. 1b, the free spectral range (FSR) of both cavities has to be an integer fraction of the supermode $FSR_s$. The best mode selectivity is provided if the two cavities are of almost identical length and $$FSR_s = NFSR_{short} = (N+1)FSR_{long} \quad (4)$$

where N is the integer number of mode repeats of the shorter cavity between two neighboring supermodes. In this case the relation between the length of the short and long cavity is:

$$d_{long} = \left(1 + \frac{1}{N}\right) d_{short} \quad (5)$$

For telecommunication applications the frequency of the supermodes created by the two active cavities preferably matches the frequency channels of the Telecom ITU grid, i.e. the supermode period has to be 100 GHz or an integer fraction of 100 GHz. For DWDM applications with a 100 GHz channel spacing the minimum active cavity length (N=1) is about 1 and 2 mm for the shorter and longer cavity, respectively. From the above formula the supermode $FSR_s$ is given by:

$$FSR_s = \frac{c}{2n\Delta d} \quad (6)$$

where $\Delta d$ is the length difference between the two cavities. The frequency of the supermode determines how many wavelength or frequency channels are accessible by tuning the coupling region. For fixed supermodes, tuning between the channels is facilitated by small changes in the coupling section. To tune the wavelength over the FTR), the length of the coupling section has to be $$d_{coupling} = \Delta d \pm \frac{c}{2nFTR} \approx \Delta d \quad (7)$$

To obtain a large tuning range the length of the coupling region $d_{coupling}$ has to be close to $\Delta d$, the difference between the two cavities building up the supermodes. A 24 µm longer or shorter coupling region leads to a tuning range of 4000 GHz, the whole width of the telecommunication C-band. Since the active cavities are considerably longer than the coupling region, the width of the supermodes is small as compared to the spectral width of the coupling cavity modes and the side mode suppression of the transmission coefficient will be better than 2 if the difference in FSR of the supermodes and the coupling region is larger than half the full width at half maximum (FWHM) of the coupling cavity modes. In this case, the number of supermodes $N_s$ over the whole tuning range has to be smaller than $2F_i$:

$$N_s \leq 2Fi \quad (8)$$

where $F_i$ is the finesse of the inner coupling cavity.

Figure 7:
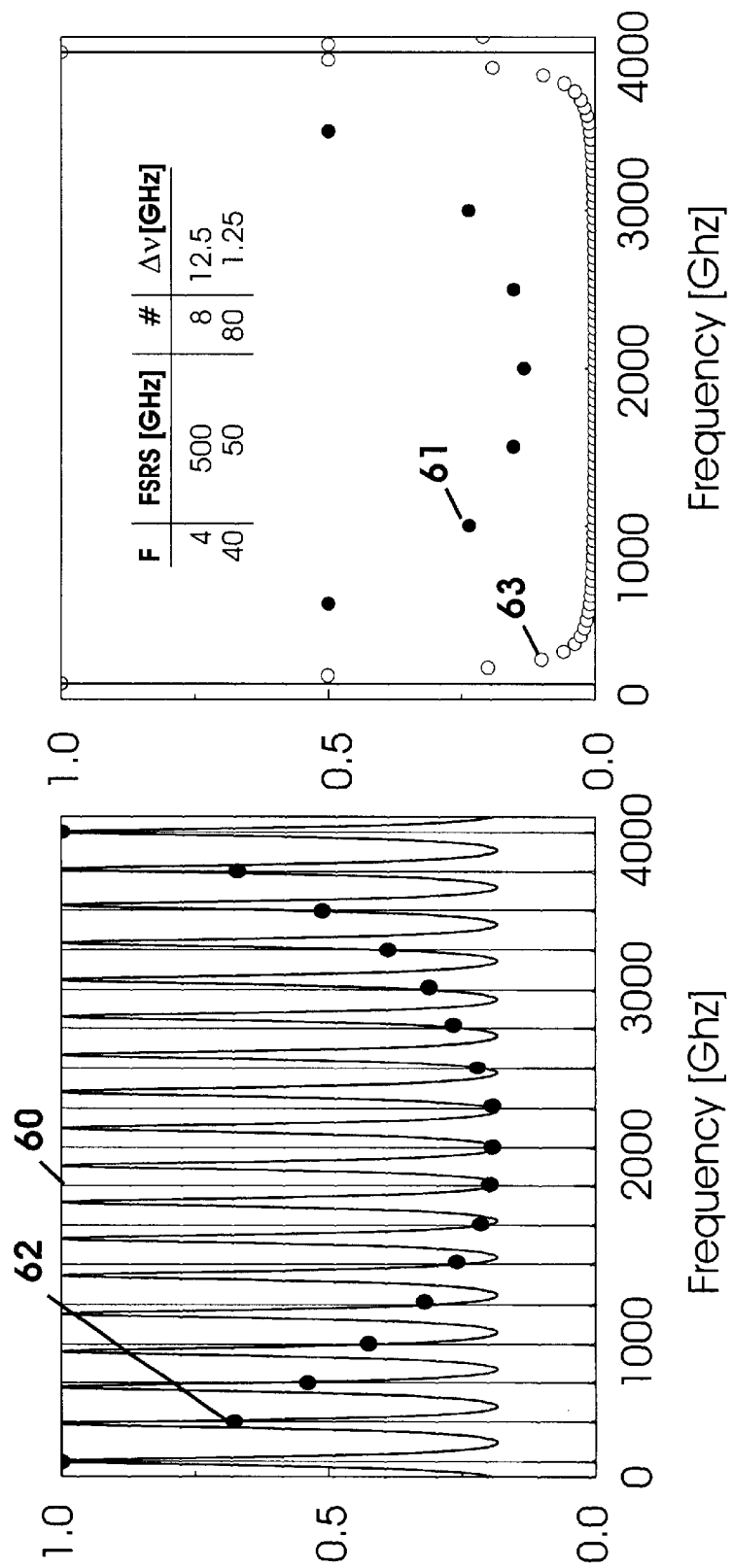
FIGS. 7a and 7b show the channel spacing of supermodes for tuning over 4000 GHz for a side mode suppression of 2 in the transmission coefficient and different finesse and coupling cavity length.

This situation is schematically illustrated in FIG. 7a, where the narrow 2-cavity supermodes 60 are plotted together with the coupling cavity transmission 62 over the whole tuning range (4000 GHz in this example) The number of channels over the whole tuning range is 16 in this example. FIG. 7b displays this situation for two different lengths of the coupling section and accordingly chosen finesse. Here the number of supermodes inside the tuning range was chosen to be 8 61 and 80 63. Obviously, longer coupling sections or more closely spaced frequency channels requires higher finesse cavities.

A very safe criterion for good supermode selectivity in two coupled cavities is to ensure that the difference in the FSR of the two cavities is smaller than the FWHM of the shorter of the two cavities. In this case the transmission of the mode that is next to one of the supermodes and has the lowest mode suppression is a factor of 4 smaller in than the supermode itself. This is illustrated in FIG. 8, which plots the active cavity modes 64 and the corresponding supermodes 66 for this limit. The blow-up shows the side mode suppression for this case. For symmetric active cavity reflectors with reflectivity $R_o$ this criterion is fulfilled if $$d_{long} \leq F_o \cdot \Delta d \tag{9}$$

where $F_o$ is the finesse of the active cavities, $$F_o = \frac{\pi \cdot \sqrt{R_o}}{1 - R_o} \tag{10}$$

The maximum length of the longer active fiber is proportional to the single cavity finesse and the length difference between the two cavities $\Delta d$. Together with $$\Delta d = \frac{c}{2n\Delta v} \tag{11}$$

and $$d_{long} = N \frac{c}{2n\Delta v} \tag{12}$$

this transforms to the following stability requirement:

$$N \leq F_o \tag{13}$$

The number of single cavity modes between two supermodes has to be smaller than the single cavity finesse.

Ultimately, the mode stability that is achievable in the glass fiber/waveguide cavities leads to restrictions in the length and finesse of the three cavities.

For typical values of $\Delta n = 10^{-5}$ $K^{-1}$ and $n_{glass} = 1.5$ the thermally induced wavelength or frequency change of the Fabry-Perot cavity modes is given by $$\frac{\Delta \lambda}{\lambda} = \frac{\Delta v}{v} = \frac{\Delta n}{n} = \frac{10^{-5}}{1.5} = 2 \cdot 10^{-6} K^{-1} \tag{14}$$

For the center wavelength of the C-band of 1550 nm this shift amounts to about 0.003 nm/K or 0.4 GHz/K, respectively. Since the temperature can be controlled at least to 0.01 K, thermal effects lead to about 0.00003 nm or 4 MHz in mode stability. Power fluctuations of the pump laser are also of less importance in rare earth doped glasses than in semiconductors since many body effects can be largely neglected. When pumped by the output of a standard 980 nm semiconductor laser stabilized by a wavelength locking FBG, the mode stability easily exceeds 10 MHz.

From the above considerations one can deduce limits for the cavity length and finesse of the tunable coherently coupled cavity fiber/waveguide laser. Table I lists the frequency distance between supermode channels, the minimum finesse required to create the supermodes with good side mode suppression, the FWHM of the coupling cavity modes, and the temperature change required for tuning over 4000 GHz and tuning between two neighboring supermodes for different length of the coupling section. A typical refractive index of the glass material of n=1.5 was assumed.

Since the mode jitter of 10 MHz has to be smaller than $FWHM_{coupling}$, the coupling length as well as the difference between the outer cavities should be limited to about 1.6 cm, which is long enough to implement any kind of electro-optic fiber/waveguide phase modulator. As shown, a temperature accuracy of 0.01 K will also not lead to mode jumps between two neighboring supermodes for a 1 cm long coupling section. The finesse required for good mode suppression is on the order of commercially available Fabry-Perot fiber etalons. The maximum length of the outer cavities, which is proportional only to the finesse (which can be as high as F=200) and $\Delta d$ should for a 1 cm long coupling region be less than 2 m. This corresponds to an FSR of about 50 MHz and 10 MHz FWHM for a finesse of 4.5 or 50% reflectivity mirrors.

Clearly, the design described in this invention lends itself to applications in fiber/waveguide lasers as opposed to semiconductor laser diodes. Active cavity dimensions in the range of millimeters to several tens of centimeters are hardly achievable in these devices that—in order to realize a homogeneous pump distribution—have typical lateral dimensions of several hundred micrometer only.

To ensure strong coupling between the two outer cavities, the coupling coefficient that is given by the ratio of transmission and reflection of the inner coupling cavity has to be larger than 1. From the simple Fabry-Perot formulas this translates into the following limit on the cavity reflectivity as a function of the intra-cavity loss A:

$$R = 1 - \frac{2A + \sqrt{2(A^2 + A^3)}}{1 + A} \tag{15}$$

A plot 70 of this formula is provided in FIG. 9, which shows the minimum reflectivity required for strong coupling as a function of the coupling cavity loss. Since for good mode suppression high finesse coupling cavities with reflectivities of R>0.7 are required, the total scattering and absorption loss in the coupling section has to be less than 10 percent. The propagation loss of commercial silica fiber is about 0.2 dB/km and the major intra-cavity loss results from scattering losses of the dielectric mirrors, which have to be minimized. One way of compensating for the relatively high insertion loss that may occur in electro-optic phase modulators, is to use an amplifying material like Er-doped LiNb in the coupling section as well.

To summarize, the coupled cavity structure has to fulfill the following design criteria:

To create the periodic supermodes, the resonance conditions are:

$$d_{long} = \frac{c}{2n\Delta v}(N+1) \text{ and } d_{short} = \frac{c}{2n\Delta v}N$$

where N is an integer and $\Delta v$ is an integer fraction of the desired DWDM channel spacing—the supermode frequency; N is the number of single cavity modes (shorter cavity) between two supermodes; c is the speed of light and n the refractive index of the active glass material. For DWDM applications with $\Delta v = 100$ GHz (50 GHz), the minimum length of the longer cavity is about 2 mm (4 mm) and the minimum length of the shorter cavity is about 1 mm (2 mm) when N=1. The minimum length of the coupling section is approximately 1 mm (2 mm) for Δv =100 GHz (50 GHz) applications.

To ensure strong coherent coupling between the two active cavities the coupling loss has to be minimized so that the coupling coefficient C is larger than 1:

$$C = \frac{T_i}{R_i} \geq 1$$

$T_i$ and $R_i$ are the transmission and reflection coefficients of the inner coupling cavity.

To select one particular supermode inside a desired full tuning range FTR, the length of the coupling region is given by:

$$d_{coupl.} = \Delta d \pm \frac{c}{2nFTR}$$

To avoid mode hopping, the length of the outer cavities is less than 2 m and the length of the coupling section less than 2 cm.

To ensure good side mode suppression,

N<$F_o$, where N is the number of single cavity modes of the shorter cavity between supermodes and $F_o$ the finesse of the outer single cavities.

$N_s$<$2F_i$, where $N_s$ is the number of supermodes in the full tuning range and $F_i$ is the finesse of the inner coupling cavity.

Co-doped Er:Yb Multi-Component Glass

To achieve high-gain, hence high output power in ultra-short lengths, e.g. a few millimeters or centimeters, the glass host must support very high Er doping concentrations to realize the necessary gain, support very high Yb doping concentration to efficiently absorb pump light in an ultra-short cavity, transfer energy efficiently from the absorbed ytterbium to the erbium and raise the saturated output power level. Compared to either silica or phosphosilicate, a multi-component glass host improves the solubility to erbium and ytterbium ions thereby allowing higher dopant levels without raising the upconversion rate and increases the phonon energy thereby reducing the lifetime of ions in the upper energy state which has the effect of improving energy transfer efficiency. The multi-component glasses support doping concentrations of the rare-earth ions erbium and ytterbium far in excess of levels believed possible with conventional glasses. Together these attributes provide greater than 2 dB per cm gain over a desired bandwidth, e.g. the telecomm C-band from 1530–1565 nm, with a very short fiber (few cm), and a less expensive scheme of using a low power multi-mode pump to pump a single-mode fiber.

In general, multi-component glasses have a glass composition that contains one or more glass network formers ($P_2O_5$ phosphate, $SiO_2$ silicate, $GeO_2$ germanate, $TeO_2$ tellurite, $B_2O_3$ borate), one or more glass network modifiers MO (alkaline-earth oxides and transition metal oxides such as BaO, BeO, MgO, SrO, CaO, ZnO, PbO and mixtures thereof), and one or more glass network intermediators XO (PbO, ZnO, $WO_3$, $Y_2O_3$, $La_2O_3$, $Al_2O_3$, $B_2O_3$ and mixtures thereof). The glass network formers are selected because their glass networks are characterized by a substantial amount of non-bridging oxygen that offers a great number of dopant sites for rare-earth ions. The modifier modifies the glass network, thereby reducing its melting temperature and creating additional dopant sites. The intermediator bridges some of the bonds in the network thereby increasing the network's strength and chemical durability without raising the melting temperature appreciably. The multi-component glasses of interest thus have a much lower softening temperature than silica ($SiO_2$), which greatly simplifies processing. The fiber core is then co-doped with high concentrations of rare-earth dopants erbium and ytterbium. The cladding layer(s) are typically undoped glass.

The present invention utilizes a subclass of multi-component glasses that comprises a $P_2O_5$ phosphate network former of 30 to 80 weight percent; a network modifier MO of 5 to 30 weight percent a network intermediator XO of 5 to 30 weight percent; and co-doped with Erbium 0.5 to 5 weight percent and Ytterbium 5 to 30 weight percent for multi-mode pumping and 0.5 to 15 weight percent for single-mode pumping. Typical doping levels are 0.5–3 wt. % Er, 2–15 wt. % Yb (single-mode) and 10–20 wt. % Yb (multi-mode). The total doping concentration (Er:Yb) is typically at least 2.5 wt. % single-mode and 10 wt. % multi-mode.

In addition, the glass composition may be "alkaline-free" or may include additional network modifiers $R_2O$ selected from alkaline metal oxides such as $K_2O$, $Na_2O$, $Li_2O$, and $Rb_2O$. In fiber waveguides the glass composition may include a mixture of network modifiers, e.g. BaO and ZnO, such that the optical fiber has a temperature coefficient of refractive index from about $-2.0 \times 10^{-6}$ to $2.0 \times 10^{-6}$.

Phosphate glass has a different bond structure than silica glass. The basic unit of structure is the $PO_4$ tetrahedron. Because phosphate (P) is a pentavalent ion, one oxygen from each tetrahedron remains non-bridging to satisfy charge neutrality of the tetrahedron. Therefore, the connections of $PO_4$ tetrahedrons are made only at three corners. In this respect, phosphate glass differs from silica-based glasses. Due to the large amount of the non-bridging oxygen, the softening temperature of phosphate glasses is typically lower than silicate glasses. At the same time, the large amount of non-bridging oxygen in phosphate glass offers a great number of sites for rare-earth ions, which results in a high solubility of rare-earth ions. The modifier modifies the glass network, thereby reducing its melting temperature and creating even more sites for rare-earth ions. A uniform distribution of rare-earth ions in the glass is critical to obtain a high gain per unit length. The intermediator bridges some of the bonds in the network thereby increasing the network's strength and chemical durability without raising the melting temperature appreciably.

In one specific embodiment, a phosphate gain fiber for multi-mode clad-pumping comprises:

a cladding that includes
  66.63% by weight $P_2O_5$,
  6.46% by weight $Al_2O_3$,
  23.42% by weight BaO,
  2.59% by weight $B_2O_3$, and
  0.9% by weight MgO and
a core that includes
  55.21% by weight $P_2O_5$,
  5.36% by weight $Al_2O_3$,
  22.2% by weight BaO,
  0.99% by weight ZnO,
  3% by weight $Er_2O_3$, and
  15% by weight $Yb_2O_3$.

Using highly Er:Yb co-doped glass that provides more than 2 dB/cm of gain and high absorption over the full tuning range, the optimum cavity lengths for the active cavities is in the range of a few centimeters (1–10 cm) only, whereas the coupling region can still be 1 to 15 mm long. The high gain over a short distance that cannot be achieved in standard silica based fiber allows for a short and very stable cavity configuration. Experimental and theoretical results suggest that output powers of more than 30 mW of single-mode output can be achieved by optically pumping one 2 cm long single cavity using a conventional 200 mW single-mode pump diode at 975 nm. Since in the current design the active cavity length is almost doubled, the expected output power of such a device is well above 50 mW over, for instance, the complete telecommunication C-band. Using high power multimode pump sources in conjunction with a cladding-pump geometry, even higher output powers are feasible.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A coupled-cavity tunable glass laser, comprising:

A first active glass waveguide of length $d_{long}$ having reflectors R1 and R2 at opposing ends that define a first longitudinal mode structure;

A second active glass waveguide of length $d_{short}$ having reflectors R3 and R4 at opposing ends that define a second longitudinal mode structure, said first and second active glass waveguides including a gain medium with a gain spectra;

A pump that couples pump light into the active cavities to invert the gain medium and provide the necessary amplification to sustain lasing;

A passive glass waveguide of length $d_{coupl}$ that separates and coherently couples the first and second active glass waveguides with a coupling coefficient C to define a supermode structure with multiple supermodes from the coincidence of modes in the first and second longitudinal mode structures in a full tuning range (FTR), said passive glass waveguide being of sufficient length to define multiple coupling coefficient peaks over said FTR;

Wherein at least one of R1 and R4 comprises a gain flattening filter that flattens the gain spectra so that said laser outputs the one supermode that coincides with a coupling coefficient peak; and A tuning mechanism capable of changing the optical path length of at least one of said active and passive waveguides to match a different supermode to a different coupling coefficient peak to tune the wavelength of a single-mode output signal over the FTR.

2. The coupled-cavity laser of claim 1, wherein $$d_{long} = \frac{c}{2n\Delta v}(N+1), \quad \text{and}$$

$$d_{short} = \frac{c}{2n\Delta v}N$$

where $\Delta v$ is the supermode frequency; N is the number of single cavity modes between two supermodes in the second active glass waveguide; c is the speed of light and n the refractive index of the active glass material, $$C = \frac{T_i}{R_i} \geq 1$$

where $T_i$ and $R_i$ are the transmission and reflection coefficients of the passive waveguide, and $$d_{coupl.} = \Delta d \pm \frac{c}{2nFTR}$$

where $\Delta d$ is difference in length of the first and second active waveguides.

3. The coupled-cavity laser of claim 2, wherein to avoid mode hopping from one supermode to another the lengths of the active waveguides are less than 2 m and the length of the passive waveguide is less than 2 cm.

4. The coupled-cavity laser of claim 3, wherein the lengths of the active waveguides are at least 1 mm and the length of the passive waveguide are at least 1 mm.

5. The coupled-cavity laser of claim 4, wherein the lengths of the active waveguides lie in the range of 1 to 10 cm and the length of the passive waveguide lies in the range of 1 to 15 mm.

6. The coupled-cavity laser of claim 2, wherein to ensure good side mode suppression of non-selected supermodes, N<$F_o$, where $F_o$ is the finesse of the active waveguides, and $N_s$<$2F_i$, where $N_s$ is the number of supermodes in the FTR and $F_i$ is the finesse of the passive waveguide.

7. The coupled-cavity laser of claim 1, wherein the supermode structure and coupling coefficient together create repeat modes, the spacing between repeat modes being equal to the FTR.

8. The coupled-cavity laser of claim 1, wherein the optical path lengths of the active waveguides are set to fix the multiple supermodes in the supermode structure at discrete wavelengths, said tuning mechanism changing the optical path length of the passive waveguide to select one of the discrete wavelengths.

9. The coupled-cavity laser of claim 8, wherein the discrete wavelengths are matched to predefined grid.

10. The coupled-cavity laser of claim 9, wherein the discrete wavelengths are spaced at an integer fraction of 100 Ghz spacing.

11. The coupled-cavity laser of claim 1, wherein the tuning mechanism comprises a pair of TECs that control the temperature of the first and second active waveguides to change their respective optical path lengths.

12. The coupled-cavity laser of claim 11, wherein the tuning mechanism comprises a third TEC that controls the temperature of the passive waveguide to change its optical path length.

13. The coupled-cavity laser of claim 12, wherein the passive waveguide includes an E/O modulator that controls the refractive index of the glass to change its optical path length.

14. The coupled-cavity laser of claim 1, wherein the first and second active and the passive waveguides comprise respective lengths of optical fiber that are fusion spliced together into an all-fiber laser.

15. The coupled-cavity laser of claim 1, wherein the first and second active and the passive waveguides each comprise a core surrounded by a cladding, said pump comprising a single-mode pump that couples pump light directly into the core.

16. The coupled-cavity laser of claim 1, wherein the first and second active and the passive waveguides each comprise a core surrounded by a cladding, said pump comprising a multi-mode pump that couples pump light into the cladding.

17. The coupled-cavity laser of claim 1, wherein the waveguide glass is a multi-component glass that comprises a glass network former of phosphorus oxide $P_2O_2$ from 30 to 80 weight percent, a glass network modifier MO from 5 to 40 weight percent, and a glass network intermediator XO from 5 to 30 weight percent, wherein MO is selected from alkaline earth oxides and transition metal oxides consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O_3$, and mixtures thereof.

18. The coupled-cavity laser of claim 17, wherein the pump is single mode and the first and second active waveguides are doped with 0.5 to 5 wt. % erbium and 0.5 to 15 wt. % ytterbium.

19. The coupled-cavity laser of claim 18, wherein the total doping concentration of erbium and ytterbium exceeds 2.5 wt. %.

20. The coupled-cavity laser of claim 17, wherein the pump is multi-mode and the first and second active waveguides are doped with 0.5 to 5 wt. % erbium and 0.5 to 30 wt. % ytterbium.

21. The coupled-cavity laser of claim 20, wherein the total doping concentration of erbium and ytterbium exceeds 10 wt. %.

22. The coupled-cavity laser of claim 20, wherein the ytterbium doping concentration exceeds 15 wt. %.

23. The coupled-cavity laser of claim 17, wherein MO includes a mixture of BaO and ZnO such that said optical waveguide has a temperature coefficient of refractive index from about $-2.0 \times 10^{-6}$ to $2.0 \times 10^{-6}$.

24. The coupled-cavity laser of claim 17, further comprising up to 5 percent by weight of an additional network modifier $R_2O$ selected from the alkali metal oxide group consisting of $Li_2O$, $K_2O$, $Na_2O$, $Rb_2O$, and mixtures thereof.

25. The coupled-cavity laser of claim 17, wherein the multi-component glass is an alkali-free glass substantially free of an additional network modifier $R_2O$ selected from the alkali metal oxide group consisting of $Li_2O$, $K_2O$, $Na_2O$, $Rb_2O$, and mixtures thereof.

26. The coupled-cavity laser of claim 17, wherein the output power of the single-mode output signal exceeds 50 mW over a FTR of 1530–1565 nm.

27. A coupled-cavity tunable glass laser, comprising:

A first active glass waveguide of length $d_{long}$ having reflectors R1 and R2 at opposing ends that define a first longitudinal mode structure;

A second active glass waveguide of length $d_{short}$ having reflectors R3 and R4 at opposing ends that define a second longitudinal mode structure, said first and second active glass waveguides including a gain medium with a gain spectra;

A pump that couples pump light into the active cavities to invert the gain medium and provide the necessary amplification to sustain lasing;

A passive glass waveguide of length $d_{coupl}$ that separates and coherently couples the first and second active glass waveguides with a coupling coefficient C to define a supermode structure from the coincidence of modes in the first and second longitudinal mode structures with multiple supermodes in a full tuning range (FTR), said passive glass waveguide being of sufficient length to define multiple coupling coefficient peaks over said FTR;

Wherein at least one of R1 and R4 comprises a gain flattening filter that flattens the gain spectra so that said laser outputs the one supermode that coincides with a coupling coefficient peak; and A tuning mechanism capable that adjusts and then fixes the optical path length of said active waveguides so that the supermode structure is matched to a predefined grid and changes the optical path length of the passive waveguide to match a different supermode to a different coupling coefficient peak to tune the wavelength of a single-mode output signal to different discrete wavelengths on the predefined grid over the FTR.

28. The coupled-cavity laser of claim 27, wherein the discrete wavelengths are spaced at an integer fraction of 100 Ghz spacing.

29. The coupled-cavity laser of claim 27, wherein the tuning mechanism comprises a pair of TECs that control the temperature of the first and second active waveguides to change their respective optical path lengths.

30. The coupled-cavity laser of claim 29, wherein the tuning mechanism comprises a third TEC that controls the temperature of the passive waveguide to change its optical path length.

31. The coupled-cavity laser of claim 29, wherein the passive waveguide includes an E/O modulator that controls the refractive index of the glass to change its optical path length.

32. A coupled-cavity tunable glass laser, comprising:

A first active glass waveguide of length $d_{long}$ having reflectors R1 and R2 at opposing ends that define a first longitudinal mode structure;

A second active glass waveguide of length $d_{short}$ having reflectors R3 and R4 at opposing ends that define a second longitudinal mode structure, said first and second active glass waveguides being formed from a multi-component glass that comprises a glass network former of phosphorus oxide $P_2O_2$ from 30 to 80 weight percent, a glass network modifier MO from 5 to 40 weight percent, and a glass network intermediator XO from 5 to 30 weight percent, wherein MO is selected from alkaline earth oxides and transition metal oxides consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O$ and mixtures thereof, and including a gain medium that is doped with 0.5 to 5 wt. % erbium and 0.5 to 30 wt. % ytterbium and has a gain spectra;

A pump that couples pump light into the active cavities to invert the gain medium and provide the necessary amplification to sustain lasing;

A passive glass waveguide of length $d_{coupl}$ that separates and coherently couples the first and second active glass waveguides with a coupling coefficient C to define a supermode structure from the coincidence of modes in the first and second longitudinal mode structures with multiple supermodes in a full tuning range (FTR), said passive glass waveguide being of sufficient length to define multiple coupling coefficient peaks over said FTR;

Wherein at least one of R1 and R4 comprises a gain flattening filter that flattens the gain spectra so that said laser outputs the one supermode that coincides with a coupling coefficient peak; and A tuning mechanism capable of changing the optical path length of at least one of said active and passive waveguides to match a different supermode to a different coupling coefficient peak to tune the wavelength of a single-mode output signal over the FTR.

33. The coupled-cavity laser of claim 32, wherein the pump is single mode and the first and second active waveguides are doped with 0.5 to 5 wt. % erbium and 0.5 to 15 wt. % ytterbium.

34. The coupled-cavity laser of claim 33, wherein the total doping concentration of erbium and ytterbium exceeds 2.5 wt. %.

35. The coupled-cavity laser of claim 32, wherein the pump is muliti-mode and the first and second active waveguides are doped with 0.5 to 5 wt. % erbium and 0.5 to 30 wt. % ytterbium.

36. The coupled-cavity laser of claim 35, wherein the total doping concentration of erbium and ytterbium exceeds 10 wt. %.

37. The coupled-cavity laser of claim 32, wherein the lengths of the active waveguides lie in the range of 1 to 10 cm and the length of the passive waveguide lies in the range of 1 to 15 mm and is approximately equal to the difference in lengths of the first and second active waveguides.

38. The coupled-cavity laser of claim 17, wherein the output power of the single-mode output signal exceeds 50 mW over a FTR of 1530–1565 nm.

* * * * *